(12) United States Patent
Inzerillo

(10) Patent No.: US 8,640,181 B1
(45) Date of Patent: Jan. 28, 2014

(54) SYNCHRONOUS AND MULTI-SOURCED AUDIO AND VIDEO BROADCAST

(75) Inventor: Joseph Inzerillo, New York, NY (US)

(73) Assignee: MLB Advanced Media, L.P., New York, NY (US)

( * ) Notice: Subject to any disclaimer, the term of this patent is extended or adjusted under 35 U.S.C. 154(b) by 0 days.

(21) Appl. No.: 13/232,937

(22) Filed: Sep. 14, 2011

Related U.S. Application Data

(60) Provisional application No. 61/383,234, filed on Sep. 15, 2010.

(51) Int. Cl.
*H04N 7/173* (2011.01)

(52) U.S. Cl.
USPC ........... 725/131; 725/116; 725/146; 725/151; 348/500; 709/203

(58) Field of Classification Search
None
See application file for complete search history.

(56) References Cited

U.S. PATENT DOCUMENTS

| | | | | |
|---|---|---|---|---|
| 5,894,320 A | * | 4/1999 | Vancelette | 725/138 |
| 6,742,176 B1 | * | 5/2004 | Million et al. | 717/120 |
| 7,010,492 B1 | * | 3/2006 | Bassett et al. | 705/14.1 |
| 8,341,662 B1 | * | 12/2012 | Bassett et al. | 725/32 |
| 2003/0208771 A1 | * | 11/2003 | Hensgen et al. | 725/100 |
| 2004/0261127 A1 | * | 12/2004 | Freeman et al. | 725/135 |
| 2005/0005308 A1 | * | 1/2005 | Logan et al. | 725/135 |
| 2007/0196077 A1 | * | 8/2007 | Seo et al. | 386/83 |
| 2007/0242929 A1 | * | 10/2007 | Okamoto | 386/83 |
| 2008/0092195 A1 | * | 4/2008 | Lim | 725/131 |
| 2009/0172200 A1 | * | 7/2009 | Morrison et al. | 709/248 |
| 2011/0222549 A1 | * | 9/2011 | Connelly et al. | 370/401 |

* cited by examiner

*Primary Examiner* — Jason J Chung
(74) *Attorney, Agent, or Firm* — Foley & Lardner LLP

(57) ABSTRACT

Embodiments provide for outputting video and allowing a user to switch between different audio streams in a synchronous manner without impacting the timeline of the audio presentation. The audio and video streams may be directed to a single sporting event. For example, a user can view video associated with a national television broadcast of a baseball game, and switch between the audio from the national broadcast and the audio from the radio broadcast. Similarly, the user can view video associated with a local television broadcast, and switch between the audio from the national, regional, and/or radio broadcast. As any sport fan would appreciate, such flexibility enables users to watch the video with, e.g., the best quality and camera angle, while at the same time listening to the audio or broadcaster they find the most appealing.

6 Claims, 12 Drawing Sheets

SYNCHRONOUS AND MULTI-SOURCED AUDIO AND VIDEO BROADCAST

CROSS REFERENCE TO RELATED APPLICATIONS

This application claims priority to and benefit from U.S. Provisional Application No. 61/383,234, filed Sep. 15, 2010, incorporated by reference herein in its entirety.

FIELD

Various embodiments relate generally to audio and video delivery. More particularly, various embodiments relate to providing audio originating from different sources in a synchronous manner with video.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims provided herein and is not admitted to be prior art by inclusion in this section.

The Internet has recently become a popular means to broadcast video. For example, the assignee of the present application provides digital feeds of sporting events over the Internet with a service known as MLB.TV. Through this service, video of sporting events is digitally encoded and transmitted through the Internet to various client devices. The video is then rendered on displays associated with the client devices for a user to enjoy.

The video is typically supplemented with audio. Such audio generally takes the form of play-by-play commentary, but can also include analysis, statistics, lineups, injury reports, advertisements, and the like. Similar to the video, the audio is transmitted through the Internet to client devices and presented via speakers associated with the client devices.

For any single sporting event, there can be multiple versions of audio and multiple versions of video. For example, in a typical New York Yankees vs. Boston Red Sox broadcast, there may be a local television broadcast for the New York Metropolis, a local television broadcast for the Boston Metropolis, and a national television broadcast for the entire country. Moreover, there may be a radio broadcast directed to the New York Metropolis, a radio broadcast directed to the Boston Metropolis, and radio broadcast for the entire country. In addition, there can be an audio broadcast in another language, such as Spanish.

MLB.TV allows users of its service to enjoy each of these audio and video broadcasts via the Internet. For example, a Boston Red Sox fan using MLB.TV can initially watch the television broadcast directed to the Boston Metropolis and subsequently switch to the broadcast directed to the New York Metropolis. The Red Sox fan may switch broadcasts because, for example, the New York broadcast may have a better viewing angle or better picture quality. The Red Sox fan, however, may not be pleased with the associated audio provided by broadcasters who regularly cover the Yankees. That is, while the Red Sox fan may appreciate the better camera angle and picture quality, the Red Sox fan may not appreciate the associated commentary favoring or focusing on the Yankees.

It would be advantageous, therefore, to provide an audio/video delivery system that allows a user to switch between different audio streams while maintaining a single video stream. Moreover, it would be advantageous to enable such switching in a seamless manner that does not negatively impact the viewing experience.

SUMMARY OF VARIOUS EMBODIMENTS

Various embodiments described herein address at least the above-mentioned need by providing a novel approach to audio and video synchronization in the context of Internet distribution. More precisely, various embodiments provide for outputting video and allowing a user to switch between different audio streams in a synchronous manner without impacting the timeline of the audio presentation.

In some embodiments, the audio and video streams may be directed to a single sporting event. For example, a user can view video associated with a national television broadcast of a baseball game, and switch between the audio from the national broadcast and the audio from the radio broadcast. Similarly, the user can view video associated with a local television broadcast, and switch between the audio from the national, regional, and/or radio broadcast. As any sports fan would appreciate, such flexibility enables users of services such as MLB.TV to watch the video with, e.g., the best quality and camera angle, while at the same time listening to the audio or broadcaster they find the most appealing or the most informative.

Various embodiments accomplish this advanced audio/video presentation by employing a media player plug-in module that provides content to a media player in a manner that does not detrimentally affect the presentation to the user. More specifically, the media player plug-in module is configured to receive a bit stream comprising a plurality of video and audio feeds of a particular event and filter, based on the content requested by the user, the received bit stream such that only packets directed to a single audio feed and a single video feed are output to the media player. If the user subsequently requests a different audio feed, the media player plug-in module continues outputting the packets directed to the video feed, but switches the audio feed in a manner that does not alter the audio presentation timeline. That is, the new audio feed is presented in a manner commensurate with the video being currently presented to the user. Thus, for example, if the user is watching the national video broadcast and switches from the national audio broadcast to a local radio broadcast, the media player plug-in module will synchronize the local radio broadcast audio to align with the national video broadcast being currently displayed to the user. The synchronization techniques employed by the media player plug-in module are, as discussed in greater detail below, novel in the relevant field of endeavor.

These and other advantages and features of various embodiments, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

Various embodiments are described by referring to the attached drawings, in which.

DETAILED DESCRIPTION OF VARIOUS EMBODIMENTS

Figure 1:
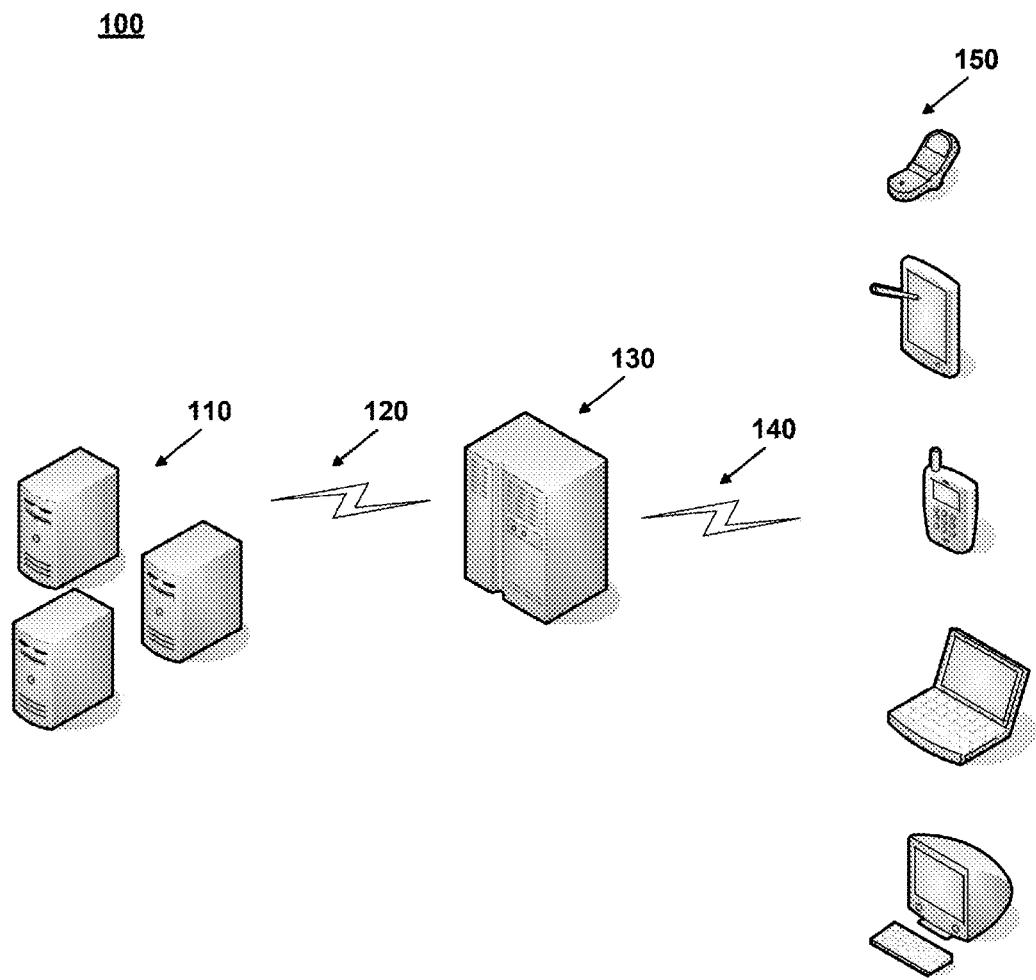
FIG. 1 is a high-level overview of a system in which various embodiments are implemented.

FIG. 1 is a high-level overview of a system 100 in which various embodiments are implemented. As illustrated, the video and audio data originate from one or more sources 110. Each source 110 provides data to a media center 130 via one or more communication networks 120. At the media center 130, the data is synchronized, routed, multiplexed/digitized, and/or encoded via hardware and/or software resident therein. The data is then transmitted in a bit stream to one or more client devices 150 using one or more communication networks 140. The data is rendered on the client device 150 using a media player and a media player plug-in module resident therein.

Figure 2:
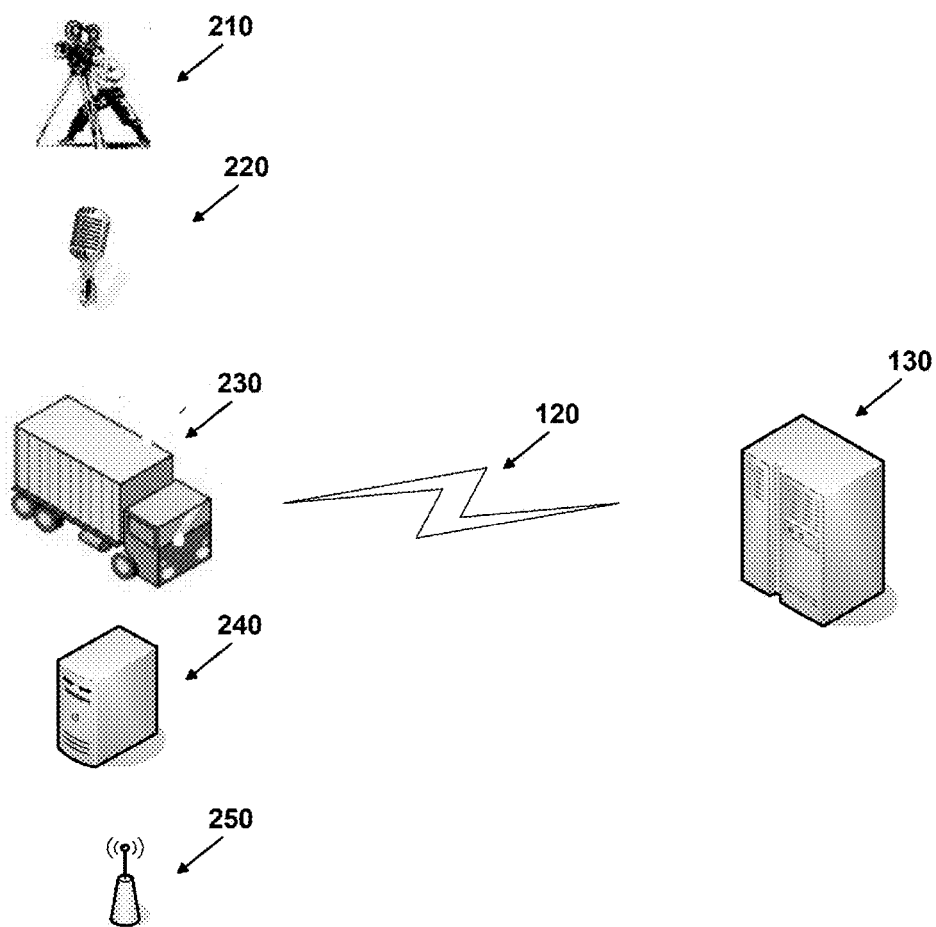
FIG. 2 is a high level overview of the sources and media center of the system.

FIG. 2 is a more detailed diagram of the one or more sources 110 and their interconnection with the media center 130. As illustrated, the source of video and audio content may take many forms. For example, the source may be a video camera 210, a microphone 220, a production truck (e.g., located proximate to a stadium, arena, or event) 230, a media server 240, a radio or satellite station 250, or any other source or production facility capable of providing audio and/or video.

Each source transmits audio and/or video feeds to the media center 130 via one or more communication networks 120. These communication networks 120 include wired and/or wireless networks. For example, the source 110 may provide audio and/or video data to the media center 130 via a coaxial cable network, a satellite network, the Internet, a mobile telephone network, and/or a fiber optic network.

The type of audio and/or video feeds transmitted generally depends on the type of source. For example, in the context of a baseball game, a production truck 230 may receive video and audio content from various cameras and microphones dispersed throughout the stadium, and pass all or only a portion of the received video and audio feeds to the media center 130 via one or more communication networks 120. A radio station announcer, on the other hand, may transmit only an audio feed to the media center 130. This audio feed may be routed directly from the announcer to the media center or indirectly via an intermediate node (e.g., a radio station).

Figure 3:
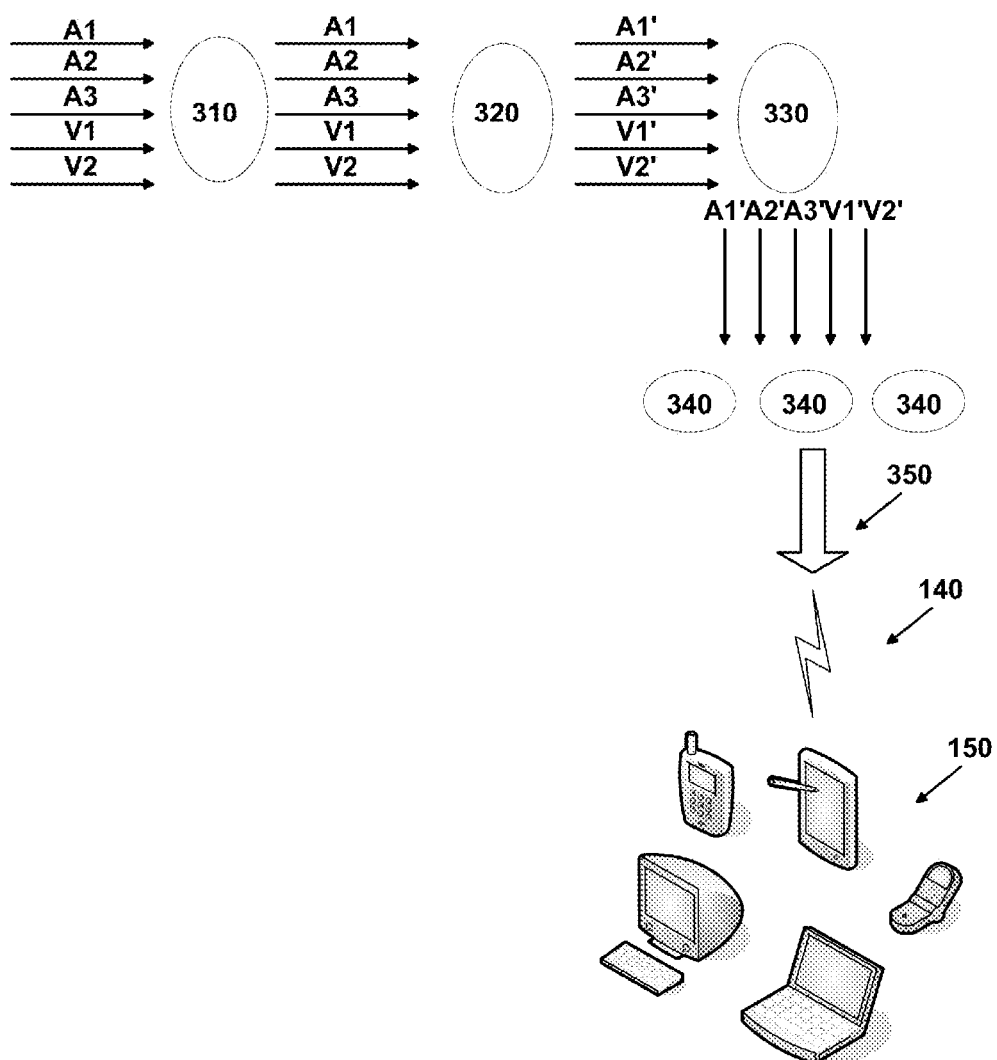
FIG. 3 is a diagram illustrating an exemplary preliminary synchronization process.

Because the media center 130 may receive feeds for the same event from different sources and at different times (e.g., due to system-induced delays or source processing delay), the media center may initially synchronize the content. FIG. 3 illustrates an example of this synchronization process, as well as the other processes that may occur at the media center. As indicated, the media center receives audio feeds (e.g., A1, A2, and A3) and video feeds (e.g., V1 and V2) at one or more communication interfaces 310. The communication interfaces 310 forward these feeds to synchronization hardware 320. The synchronization hardware 320 in conjunction with software resident thereon synchronizes the incoming feeds. The incoming feeds may be synchronized based on, e.g., the last or slowest feed to arrive. For example, if A1, A2, V1, and V2 arrive at approximately the same time, but A3 arrives at a later time, the synchronization hardware 320 may buffer and release A1, A2, V1, and V2 to match the timing of the A3 feed. Similarly, if video feed V1 is the last feed to arrive, the synchronization hardware 320 may buffer and release the other feeds (i.e., A1, A2, A3, and V2) to match V1.

In the context of a baseball game broadcast, this initial synchronization may be conducted prior to the beginning of the game. That is, the media center may begin receiving audio and video feeds from various sources 110 and conduct the synchronization process to align the content prior to the first pitch. Such alignment may be automatically conducted by the synchronization hardware 320, or may be manually conducted based on instructions provided by an operator of the synchronization hardware 320 who views or listens to the content and decides synchronization points. These synchronization points may be, in the context of baseball, based on the cracking sound of a bat or the sound of a baseball hitting a catcher's glove. In other contexts, the synchronization point may be based on a speaker's lips.

Once all of the feeds are synchronized, they are passed to a router 330 (e.g., a 10-A switching router). The router 330 routes the synchronized feeds (A1', A2', A3', V1' and V2'), also known as elemental streams, to one or more encoders 340. The one or more encoders 340 digitize, compress, and/or interleave the streams to form a single data stream or bit stream 350. More particularly, the one or more encoders 340 apply compression techniques to reduce the bandwidth and number of bits needed to encode the information. The encoders also apply statistical multiplexing techniques to maximize efficiency. Part of this process may include adding time markers or signatures in the bit stream 350, as well as adding program identifiers within the bit stream 350. Furthermore, the encoders may encode the audio and video streams at various bitrates into a variety of streams to allow audio and video to be played by a variety of different devices over a variety of different network speeds.

In some embodiments, the streams may be sent to encapsulators based on, e.g., an Apple IETF HTTP live streaming specification. Each stream may have its own encapsulator that may break up the bit stream 350 into, e.g., six second chunks, and create a text file indexing and sequencing the chunks. The encapsulators may be synchronized so that the chunks for each bitrate cover the same time periods. The chunks and the index files may be stored on a server of the media center 130 or on another server. The chunks may be stored in encrypted format. The index file may be manifested as a Uniform Resource Locator (URL) that viewers can request via a web browser.

After the above-mentioned processes are complete, the bit stream 350 is transmitted in chunks through network 140 to one or more client devices 150, which receive the chunks in nearly real-time and reassemble the chunks into a bit stream. This bit stream, as discussed below, is then filtered based on program identifiers that map to user selections.

Network 140, interconnecting the media center 130 and client devices 150, may include any combination of wired or wireless networks, such as for example an Ethernet LAN, a token ring LAN, a wide area network, the Internet, and/or a mobile telephone network (e.g., Global System for Mobile Communications (GSM), Wideband Code Division Multiple Access (W-CDMA), Code Division Multiple Access (CDMA), Long Term Evolution (LTE), Ultra Mobile Broadband (UMB), High Rate Packet Data (HRPD), and Worldwide Interoperability for Microwave Access (WiMax), a wireless Local Area Network (LAN), a Bluetooth personal area network, satellite communication, etc.) In various embodiments, geographically dispersed servers within the network 150 may be used to distribute the data from the media center 130 to the client devices 150. These geographically dispersed servers may receive content from the media center 130 and distribute the content upon request to the client devices.

The client devices 150 may include, but are not limited to, personal computers, PDAs, notebooks, netbooks, laptops, tablets, telephones, smartphones, televisions, Apple iPhones®, Apple iPads®, Sony Playstations®, Nintendo Wiis®, Microsoft XBoxs®, and the like. The client devices 150 may be stationary or mobile, and may communicate using various transmission technologies including, but not limited to, Global System for Mobile Communications (GSM), Wideband Code Division Multiple Access (W-CDMA), Code Division Multiple Access (CDMA), Time Division Multiple Access (TDMA), Frequency Division Multiple Access (FDMA), Long Term Evolution (LTE), Ultra Mobile Broadband (UMB), Mobile Telecommunications System (UMTS), High Rate Packet Data (HRPD), and Worldwide Interoperability for Microwave Access (WiMax), a wireless Local Area Network (LAN), a Bluetooth personal area network, an Ethernet LAN, a token ring LAN, a wide area network, the Internet, etc.

Each client device includes a media player, a web browser, an operating system, and a media player plug-in module associated with the media player. The media player comprises computer software for playing audio and video content provided by the media player plug-in module. The media player may be, for example, Flash Media Player, Windows Media Player, QuickTime Player, VLC, MPlayer, xine, Totem, RealPlayer, and/or the like. The web browser may be, for example, Internet Explorer, Mozilla, Firefox, SeaMonkey, Opera, Safari, Google Chrome, and/or the like. The operating system may be, for example, Android, iOS, Blackberry OS, Windows Phone, WebOS, Bada, Symbian, Maemo, and/or the like.

The media player plug-in module is software that adds functionality to the media player. The media player plug-in module (e.g., the NexDef plug-in) may be downloaded from a website (e.g., MLB.com) or it may come pre-installed on the client device 150. The media player plug-in module may be used to make the above-mentioned advanced audio synchronization features and allow the user to stream high quality feeds at the media player. Such added functionality is necessary because media players such as the Flash Media Player generally cannot handle switching audio streams in a synchronized manner while displaying video. A media player plug-in module is, therefore, necessary to receive the multiple audio and video data streams, organize and synchronize the data streams based on user-requests, and provide the data streams to the media player in a manner the media player understands.

Figure 4:
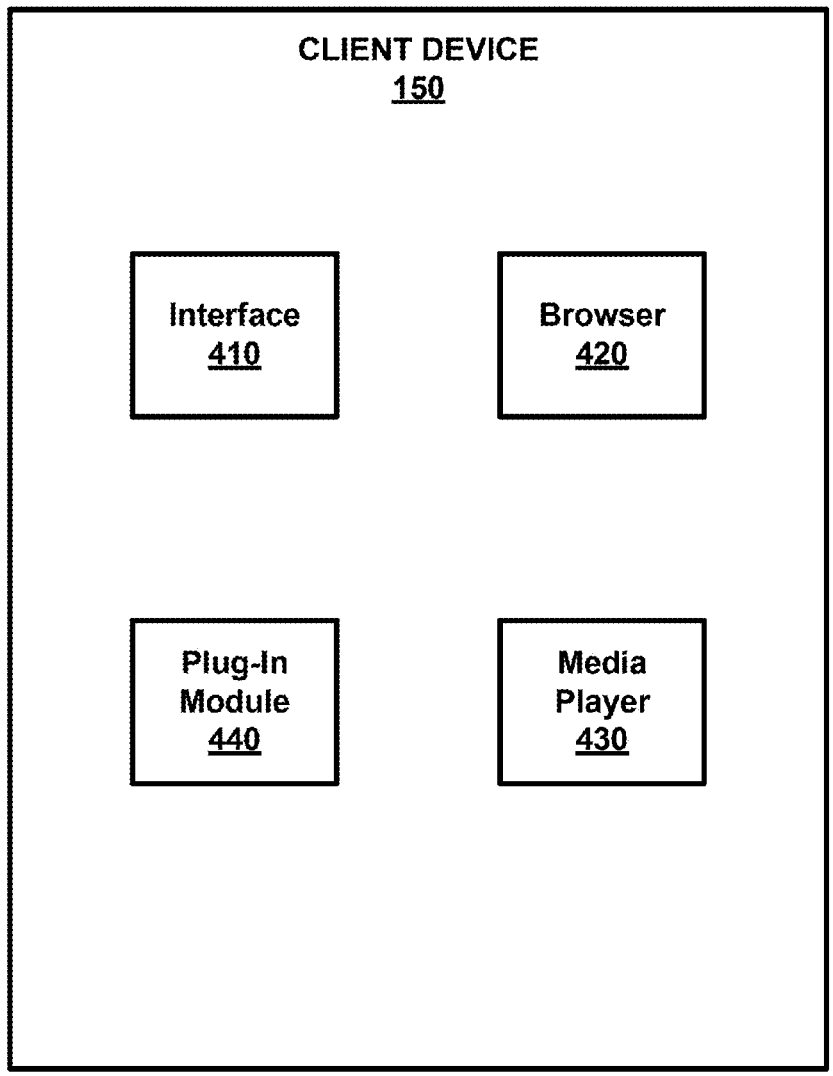
FIG. 4 is a block diagram on an exemplary client device.

FIG. 4 is a block diagram illustrating the exemplary details of client device 150. The client device 150 may include a network interface 410, a web browser 420, a media player 430, and media player plug-in module 440. A user may interact with the web browser 420 to request a web page. When the web browser 420 receives a request from a user to present a web page hosted by a web server, the web browser 420 may cause network interface 410 to send one or more messages to a web server. The messages sent by network interface 410 include a request to retrieve the web page. Subsequently, network interface 410 may receive one or more messages that include the requested web page. When network interface 410 receives the messages that include the web page, the web browser 420 may begin to render the web page. While rendering the web page, web browser 420 may determine that the web page includes an embedded media object. When the web browser 420 determines that the web page includes an embedded media object, the web browser 420 may cause media player 430 to start executing on client device 150. Further, it may be determined that the webpage requested requires use of media player plug-in module 440. If the media player plug-in module 440 is resident on the device, it may be executed on the client device 150. On the other hand, if the media player plug-in module 440 is not resident on the client device, a prompt may be displayed on the client device 150 requesting the user to download and install the media player plug-in module 440. Once the media player plug-in module 440 is installed on the client device 150, it may be executed to provide, for example, enhanced audio/video options.

In various embodiments, once all software is installed on a user's computing device, the user can access a webpage to begin streaming video and audio content. When a user requests to view a particular sporting event, certain restrictions (e.g., location-based blackout restrictions) may be verified. If the restrictions are passed, an application may be provided with an index file from one of the graphically dispersed servers or the central node. The application may pass the index file to the media player (e.g., Adobe Flash Payer), and the media player may then may request via http requests the data chunks in order from the server or central node, dynamically varying the bitrate of the data chunks requested based on the current network connection speed.

Figure 5:
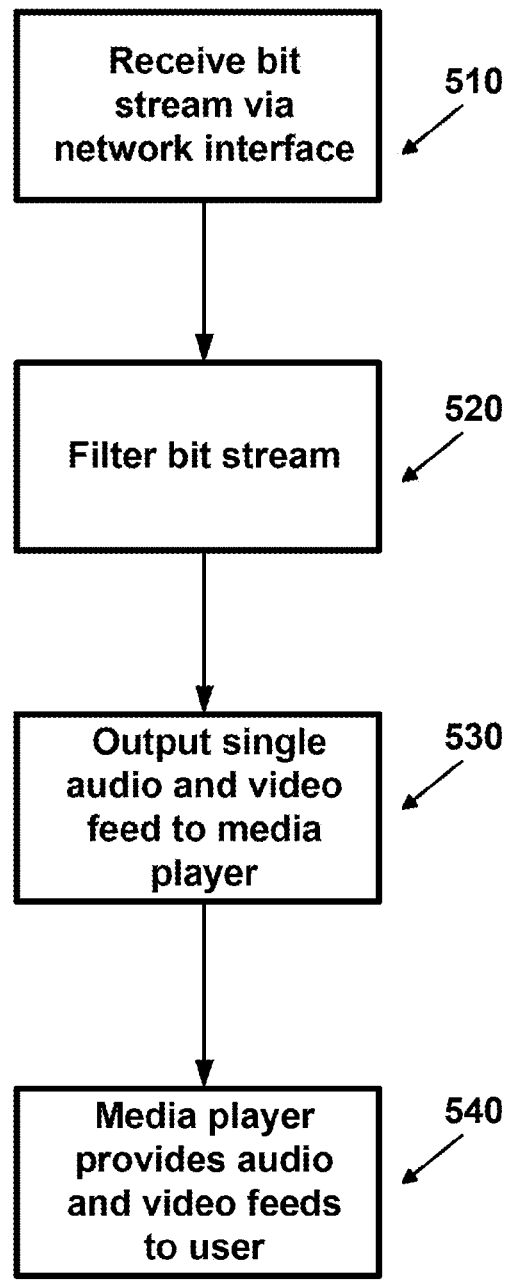
FIG. 5 is a flowchart of exemplary processes of the media player plug-in module.
Figure 6:
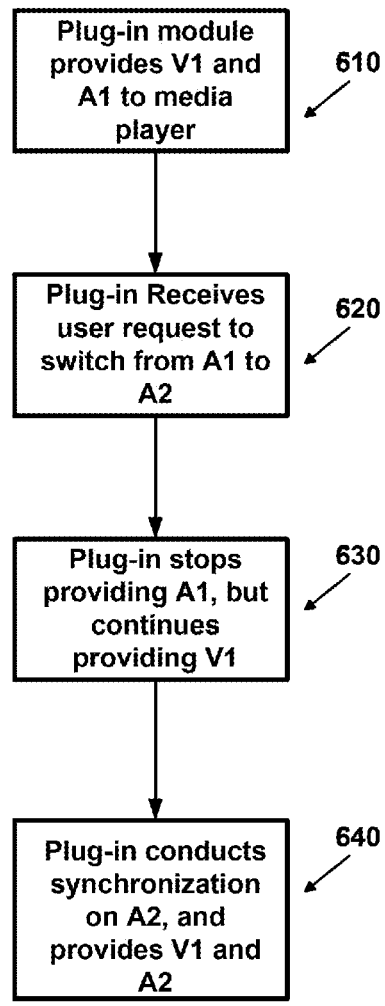
FIG. 6 is a flow chart of exemplary processes of the media player plug-in module.
Figure 7:
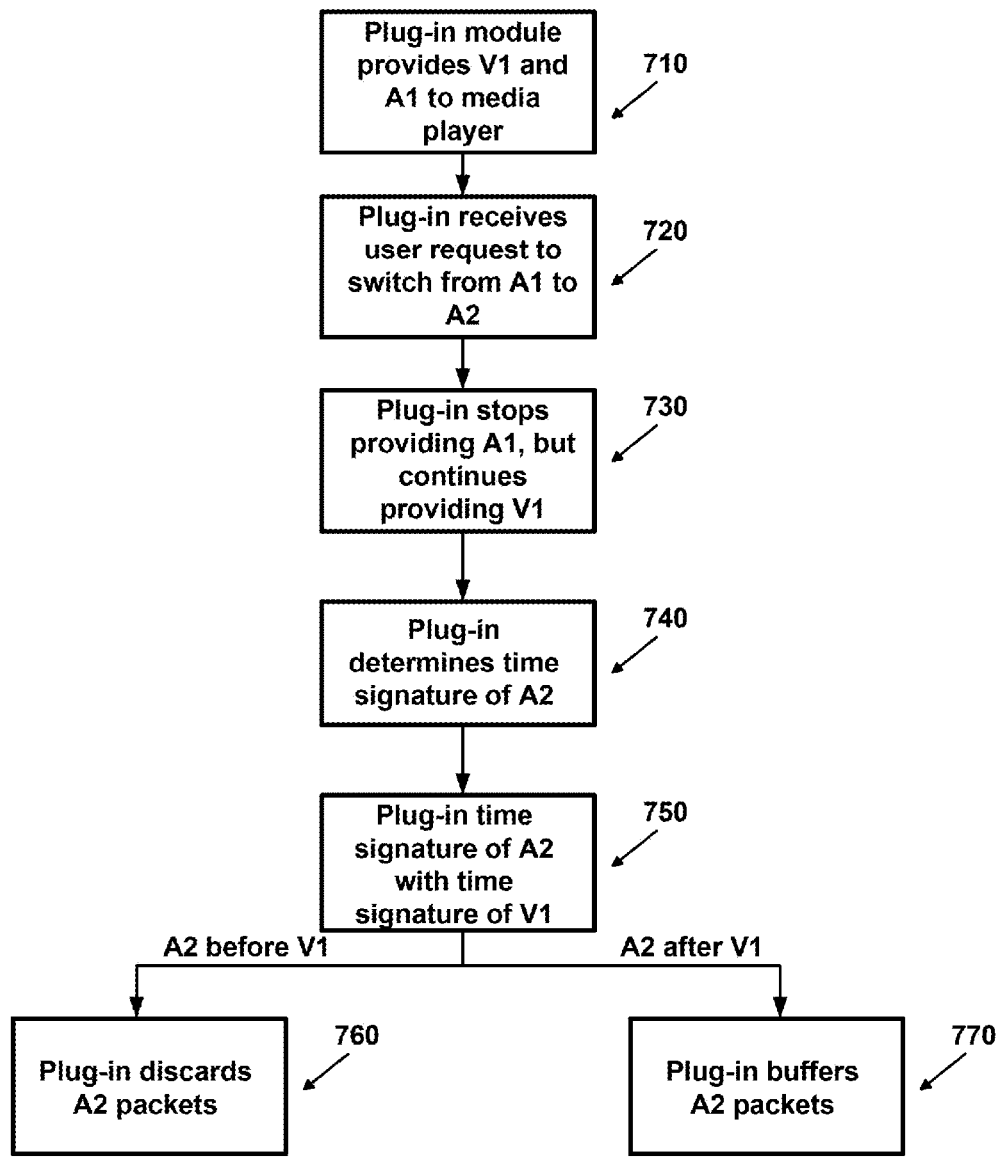
FIG. 7 is a flow chart of exemplary synchronization processes of the media player plug-in module.

FIGS. 5-7 are flowcharts illustrating exemplary operations of the media player plug-in module 440. It should be appreciated that the exemplary operations illustrated in the examples of FIG. 5-7 are merely exemplary operations and that many other operations are possible within the scope of this disclosure.

FIG. 5 is a flowchart illustrating exemplary operations of the media player plug-in module 440 in response a user request for streaming content (e.g., a recorded or live baseball game). At step 510, in response to a user request via the web browser 420, the media player plug-in module 440 receives a bit stream (feed) directly or indirectly from media center 130 via network interface 410. The bit stream may comprise, for example, a plurality of audio and video feeds of a single sporting event. In particular, the bit stream may comprise, e.g., video associated with a home team broadcast, video associated with an away team broadcast, video associated with a national broadcast, audio associated with a home team radio broadcast, audio associated with an away team radio broadcast, audio associated with a national radio broadcast, audio associated with a foreign language radio or television broadcast, and audio associated with the natural sounds on the filed.

At step 520, based on the particular content requested by the user, the media player plug-in module 440 filters the received bit stream. In particular, the media player plug-in module 440 filters the content based on a program identifier associated with the audio and video requested. At step 530, the media player plug-in module 440 then sends a single video stream (V1) and audio stream (A1) to the media player 430. The media player 430 then provides, at step 540, the video (V1) and audio (A1) to the user. Hence, the media player plug-in module 440 initially acts as a filtering device to parse the bit stream and provide a single audio (A1) and a single video stream (V2) to the media player 430.

FIG. 6 is a flowchart illustrating exemplary operations of the media player plug-in module 440 in response a user request to switch audio streams. At step 610, the media player plug-in module 440 provides a first video stream (V1) and a first audio stream (V1) to media player 430. At step 620, the media player plug-in module 440 receives a request from the user to switch from the first audio stream (A1) to a second audio stream (A2). For example, the user may receive a request to switch from the national television audio stream to a local radio audio stream. The media player plug-in module 440, therefore, at step 630, immediately stops providing the first audio stream (A1) to media player 430, but continues to provide the first video stream (V1) to media player 430. At step 640, the media player conducts a synchronization process on the inbound second audio stream (A2) and, once the inbound second audio stream (A2) is synchronized with the first video stream (V1), the media player plug-in module 440 begins sending the second audio stream (A2) to media player 430. The user, as a result, is presented with the second audio stream (A2) in a manner that matches the current video (V1) being displayed on the media player 430.

FIG. 7 is a flowchart illustrating exemplary operations conducted by the media player plug-in module 440 to synchronize the above-mentioned second audio stream (A2) with above-mentioned first video stream (V1). At step 710, based on a request from the user, the media player plug-in module 440 filters the received bit stream and provides a first audio stream (A1) and a first video stream (V1) to media player 430 in the form of a single bit stream. The single bit stream generally includes one or more video packets followed by one or more audio packets. Each audio and video packet includes a time signature. For example, the single bit stream sent to the media player 430 may take the following exemplary form (with the subscript representing the time signature): $V1_1, V1_2, A1_1, A1_2, A1_3, V1_3, A1_4, V1_4, V1_5, A1_5$. Because the received audio and video packets are generally synchronized with respect to time signatures, the audio and video appear synchronized to the user.

If, at step 720, the media player plug-in module 440 receives a request to switch from the first audio stream (A1) to a second audio stream (A2), the media player plug-in module 440, at step 730, continues to transmit the first video stream (V1), but discontinues transmission of the first audio stream (A1). For example and continuing the example from above, the single bit stream transmitted to the media player 430 may appear as follows in response to request to change audio streams: $V1_1, V1_2, A1_1, A1_2, A1_3, V1_3, A1_4, V1_4, V1_5, A1_5, V1_6, V1_7, V1_8, V1_9, V1_{10}, V1_{11}, V1_{12}, V1_{13}, V1_{14}, V1_{15}$.

At step 740, the media player plug-in module 440 determines the current time signature of the inbound second audio stream (A2). For example and continuing the above example, the time signature of the second audio stream (A2) packet may be $A2_7$. This presents a problem because, if the second audio stream (A2) were to be sent to media player 430, the audio ($A2_7$) would be delayed with respect to the video ($V1_{15}$) currently being displayed. The delay would occur because the video being displayed would have a time signature number of 15, and the audio being displayed would have time signature number of 7. Thus and as discussed below, media player plug-in module 440 synchronizes the second audio stream (A2) with the first video stream (V1) prior to providing the second audio stream (A2) to the media player 430.

At step 750, the media player plug-in module 440 determines whether the time signature associated with the second inbound audio stream (A2) is before or after the time signature associated with the first video stream (V1) being sent to the media player 430. To make this determination, the media player plug-in module 440 may reference the last video stream packet sent to the media player 430, or, alternatively, the next video stream packet to be sent media player 430.

If the time stamp associated with the second audio stream (A2) is before the time stamp associated with the first video stream (V1), the media player plug-in module, at step 760, discards second audio stream (A2) packets until the time signatures of the second audio stream (A2) and first video stream (V1) match or are close with respect to one another. For example, if the time stamp associated with the last video stream packet is $V1_{15}$ and the time stamp associated with the second inbound audio stream is $A2_7$, the media player plug-in module 440 will discard at least $A2_7, A2_8, A2_9, A2_{10}, A2_{11}, A2_{12}, A2_{13}$, and $A2_{14}$. The media player plug-in module 440 will then begin providing the second audio stream (A2) with the first video stream (V1) in a single bit stream once the time stamps match or are close with respect to one another. For example, the single bit stream transmitted to the media player 340 including the first video stream (V1) and the second audio stream (A2) may appear as follows: $V1_{15}, V1_{16}, A2_{16}, A2_{17}, A2_{18}, V1_{17}, V1_{18}, A2_{19}$, and so on. As a result, when the media player 340 begins providing both the first video stream (V1) and the second audio stream (A2), the audio and video will appear synchronized with respect to time to the user.

If the time signature associated with the second audio stream (A2) is after the time signature associated with the first video stream (V1), the media player plug-in module, at step 770, will buffer the second audio stream (A2) packets until the time signatures of the second audio stream (A2) and first video stream (V1) match or are close with respect to one another. For example, if the time stamp associated with the last video stream packet is $V1_{15}$ and the time stamp associated with the inbound second audio stream $A2_{23}$, the media player plug-in module 440 will buffer the inbound second audio stream (A2) until the first video stream (V1) "catches-up" with the inbound second audio stream. Once both streams are equivalent or close with respect to time signatures, the media player plug-in module 440 will begin sending both the first video stream (V1) and the second audio stream (A2) in a single bit stream transmitted to the media player 340. Using the example above, this bit stream may appear as follows: $V1_{15}, V1_{16}, V1_{17}, V1_{18}, V1_{19}, V1_{20}, V1_{21}, V1_{22}, V1_{23}, A2_{23}, A2_{24}, V1_{24}, A2_{25}$, and so on. As a result, when the media player 340 begins providing both the first video stream (V1) and the second audio stream (A2), the audio and video will be synchronized with respect to time to the user.

Figure 8:
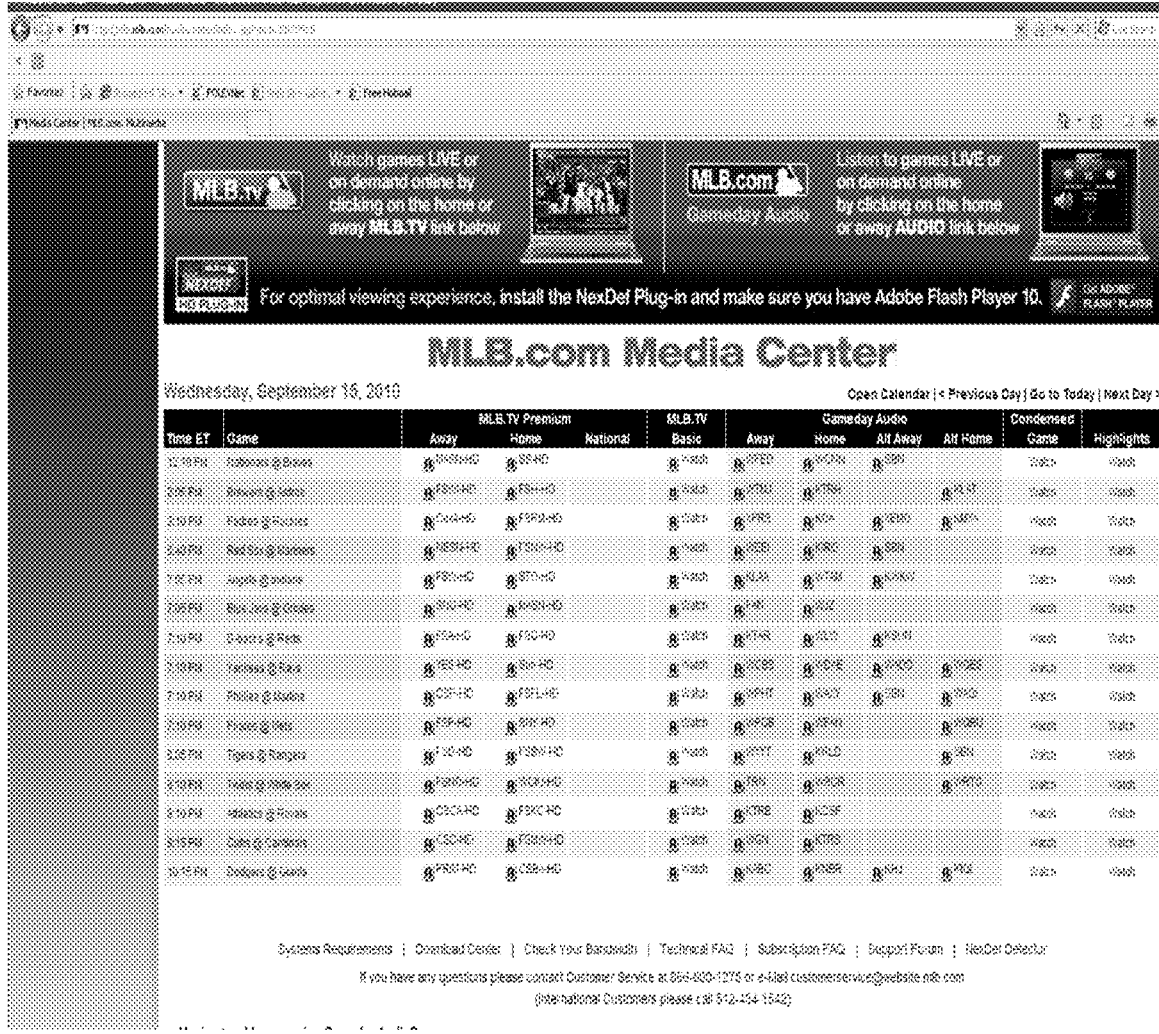
FIG. 8 is a screen shot of an exemplary interface associated with various embodiments.

FIG. 8 is a screen shot showing an exemplary window that may enable access to the above-mentioned video with enhanced audio. After a log-in and authentication procedure using, e.g., a username and password, a user may be presented with options to select recorded or on-going (i.e., "live") sporting events. Each sporting event may have a plurality of audio options and a plurality of video options. The user may select a particular video feed of a particular game of interest. For example, a user may select the Nationals vs. Braves "home" feed.

Figure 9:
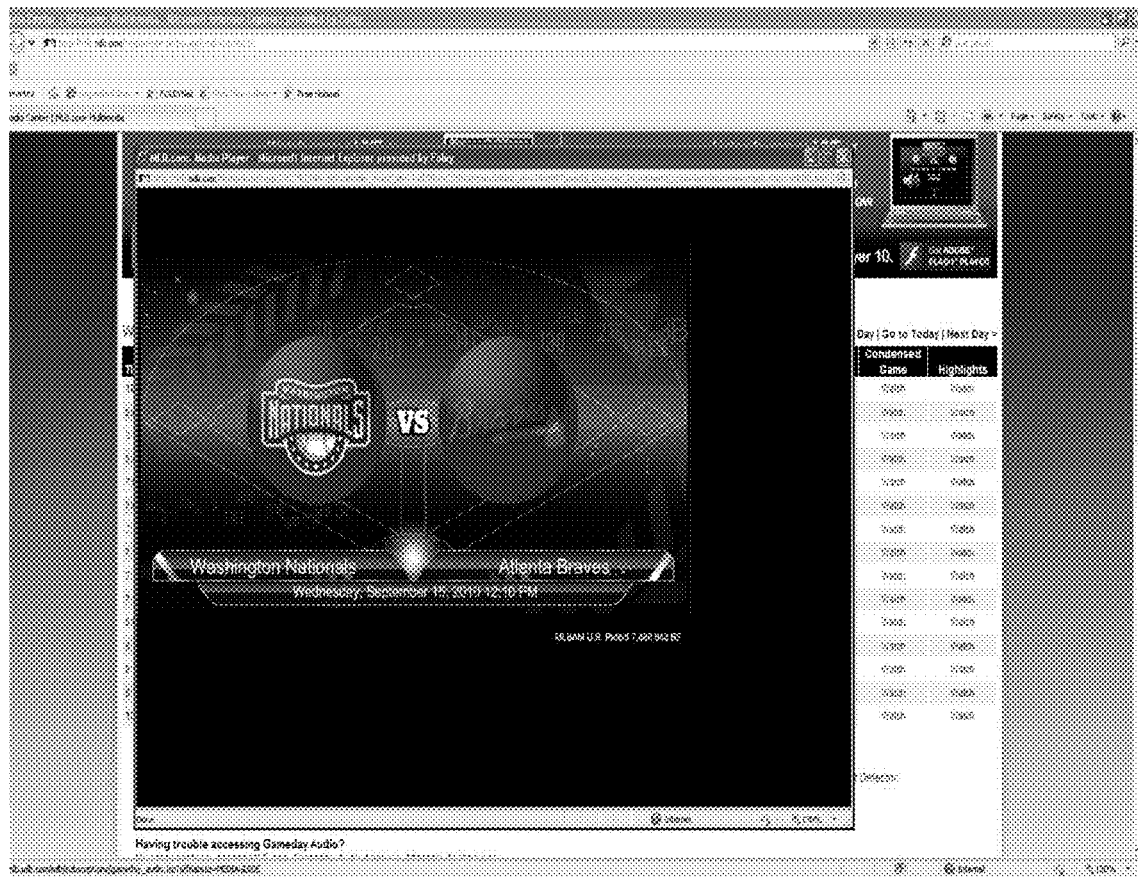
FIG. 9 is a screen shot of an exemplary interface associated with various embodiments.
Figure 10:
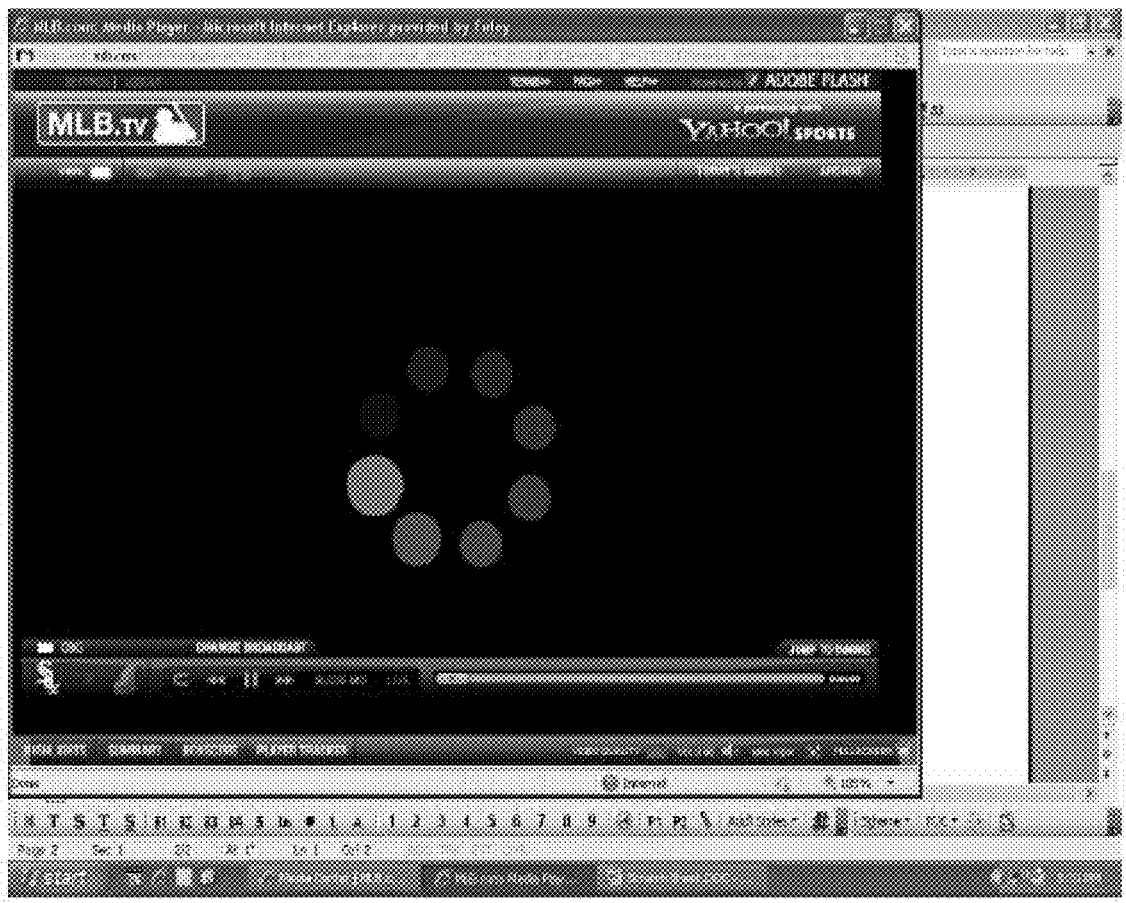
FIG. 10 is a screen shot of an exemplary interface associated with various embodiments.
Figure 11:
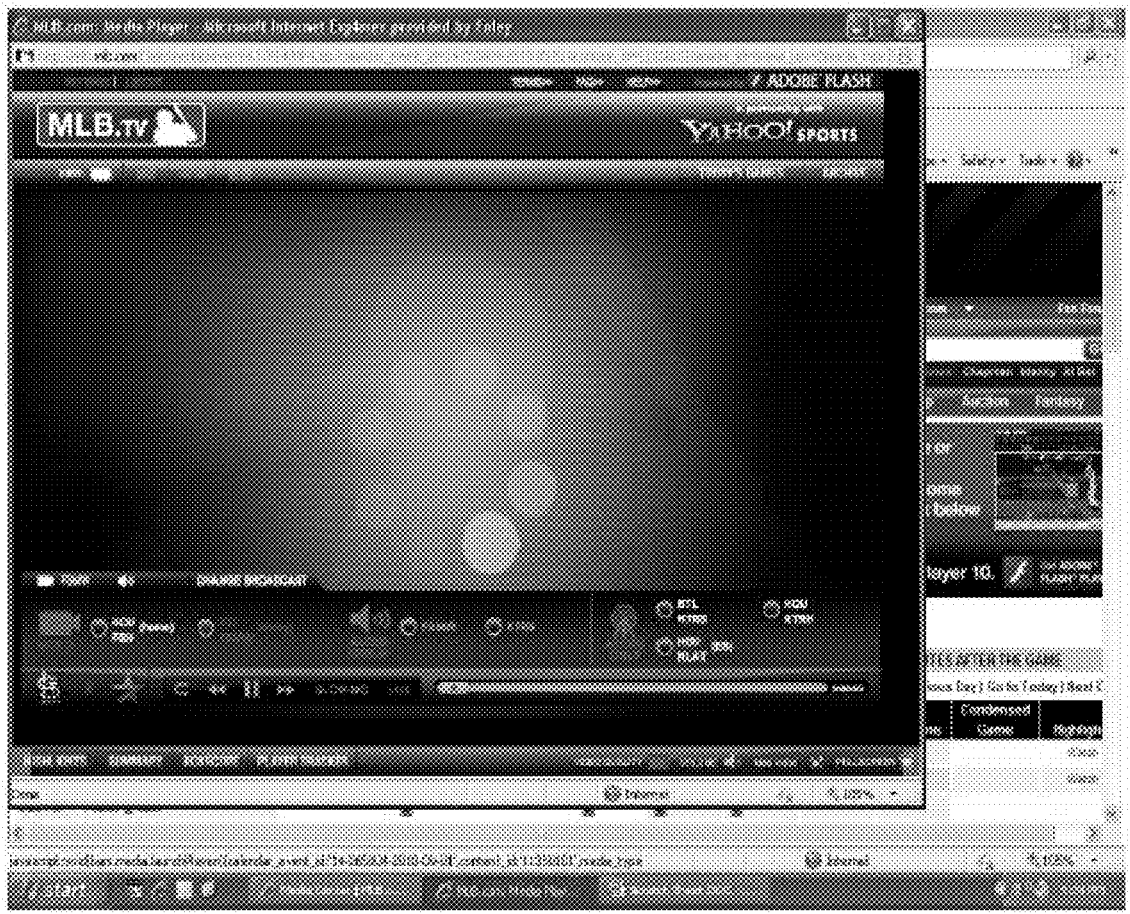
FIG. 11 is a screen shot of an exemplary interface associated with various embodiments.

Upon selection, a media player, such as the Flash Media Player displayed in FIG. 9, may appear on the graphical user interface. As shown in the bottom portion of FIG. 10, the media player may include options such as forward, reverse, pause, "jump to inning," and "change broadcast." While viewing a particular game, the user may select "change broadcast" and, as shown in FIG. 11, be presented with a plurality of broadcast options. For example, the user may be presented with an option to select a home-team video stream, an away-team video stream, a home-team audio stream, an away-team audio stream, and/or various associated radio streams.

Figure 12:
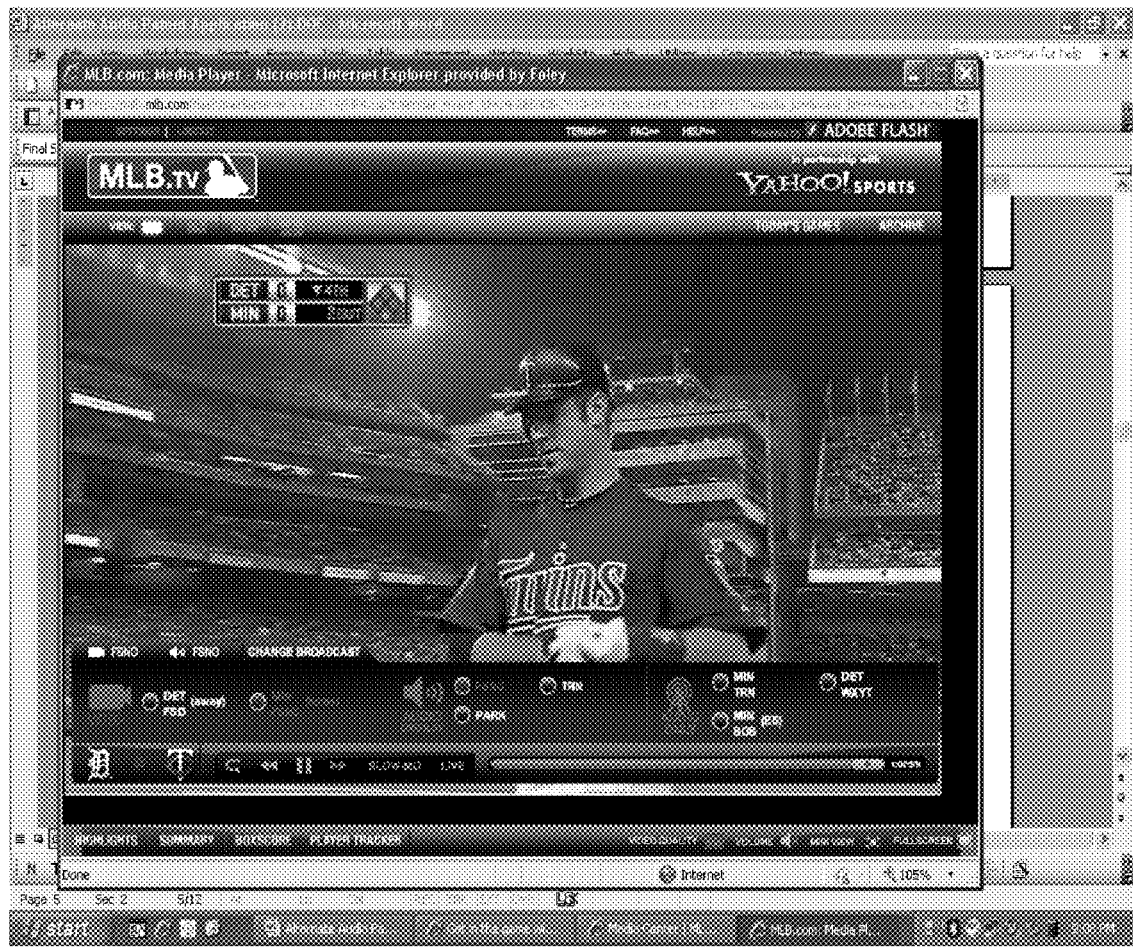
FIG. 12 is a screen shot of an exemplary interface associated with various embodiments.

If the user selects one of the video options, as shown in FIG. 12, the user may have the option switch the audio while continuing to view the same video. For example, the user may view the same video while changing the audio to listen to the home team television broadcast, the away team television broadcast, the home team radio broadcast, or the away team radio broadcast. In addition, and as illustrated in FIG. 12, the user may select an in-park or natural sounds option. This option provides the actual sounds on the field without broadcaster commentary. Once the user selects a desired audio option, the video will continue playing, while the audio switches in the synchronized manner described above.

While various embodiment described herein are in the context of a baseball game, it should be understood that the advanced audio and video synchronization processes could be applied to all types of sports broadcasts including, but not limited to, football, basketball, hockey, golf, auto racing (e.g., NASCAR), Olympic sports, boxing, mixed martial arts, swimming, soccer, rugby, cricket, wrestling, and the like.

Moreover, aspects of the present disclosure can be applied to non-sports broadcasts. For example, the above-mentioned advanced audio and synchronization processes could be used in association with political speeches or news events broadcast via a media player. Alternatively, the above-mentioned advanced audio and synchronization processes may be used in association with a concert or music event broadcast via a media player.

While the above embodiments have focused on audio originating from television broadcasts or radio broadcasts, it should be understood that the audio can originate from other sources. For example, in some embodiments, the audio may originate from coaches, players, referees, trainers, umpires, or pit crews that are "mic'd up." For example, a user may switch from listening to a local or national radio or television broadcast to listening to a player or coach on the field with a microphone attached thereto. Furthermore, in some embodiments, the user may switch from listening to an English-language broadcast to a foreign language broadcast that is synchronized with video being presented. Such foreign languages include, but are not limited to, Spanish, French, Chinese, Japanese, Portuguese, Arabic, Persian, Urdu, Hindi, Norwegian, and German, to name a few. This option is especially beneficial in Olympic type environment where users may want to switch between different language options while watching the same video.

Some embodiments are directed to a method for receiving a bit stream including at least one video feed and at least two audio feeds of an event. The bit stream may be filtered and a first video feed of the at least one video feed and a first audio feed of the at least two audio feeds may be provided to a media player. In response to receiving a request to change audio feeds, transmission of the first audio feed may be discontinued, while transmission of the first video feed may continue to the media player. A second inbound audio feed may then be synchronized with respect to the first video feed, and provided to the media player with the first video feed in a synchronized manner.

Other embodiments are directed to a non-transitory computer-readable medium having instructions stored for conducting the above-mentioned processes when executed. Further, various embodiments are directed to a device including a processor, a communication interface, and a non-transitory computer-readable medium have instructions stored thereon that, in response to being executed by the processor, cause the device to perform the above-mentioned operations.

The various embodiments described herein are described in the general context of method steps or processes, which may be implemented in one embodiment by a computer program product, embodied in a non-transitory computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Additionally, the various embodiments may be implemented in software, hardware, application logic or a combination of software, hardware, and application logic. The software, application logic and/or hardware may reside, for example, on a chipset, a mobile device, a desktop, a laptop or a server. Software and web implementations of various embodiments can be accomplished with standard programming techniques with rule-based logic and other logic to accomplish various database searching steps or processes, correlation steps or processes, comparison steps or processes and decision steps or processes. Various embodiments may also be fully or partially implemented within network elements or modules. It should be noted that the word "module," as used herein, is intended to encompass implementations using one or more lines of software code, and/or hardware implementations, and/or equipment for receiving manual inputs.

Individual and specific structures described in the foregoing examples should be understood as constituting representative structure of means for performing specific functions described in the following the claims, although limitations in the claims should not be interpreted as constituting "means plus function" limitations in the event that the term "means" is not used therein. Additionally, the use of the term "step" in the foregoing description should not be used to construe any specific limitation in the claims as constituting a "step plus function" limitation.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. Such hardware, software, firmware, or any combination thereof may part of or implemented with any one or combination of the servers, databases, associated components in the system, components thereof, and/or the like. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method comprising:
    receiving a bit stream including at least one video feed and at least two audio feeds, wherein the at least one video feed and at least two audio feeds are directed to a single event;
    filtering the bit stream and providing to a media player a first video feed of the at least one video feed and a first audio feed of the at least two audio feeds;
    in response to receiving a request to change audio feeds, discontinuing the first audio feed from being provided to the media player and continuing to provide the first video feed to the media player;
    synchronizing a second audio feed of the at least two audio feeds, wherein the second audio feed is synchronized with respect to the first video feed; and
    providing to the media player the first video feed and the second audio feed,
    wherein synchronizing the second audio feed comprises:
        comparing a time signature associated with the second audio feed with a time signature associated with the first video feed and discarding portions of the second audio feed based on the result of the comparing; and
        comparing a time signature associated with the second audio feed with a time signature associated with the first video feed and buffering the second audio feed based on the result of the comparing,
    wherein the at least one video feed and the at least two audio feeds are initially synchronized at a media center prior to reception based on at least the timing of a slowest feed received from one or more sources,
    wherein the filtering and synchronizing processes are conducted by a media player plug-in module, and
    wherein the event is a baseball game, a football game, a basketball game, a hockey match, a golf tournament, an auto racing event, an Olympic event, a boxing match, a mixed martial arts event, a swimming event, a soccer match, a rugby tournament, a cricket match, or a wrestling event.

2. The method of claim 1, wherein the at least two audio feeds include at least two of: audio originating from a national television broadcast, audio originating from a local television broadcast, audio originating from a national radio broadcast, audio originating from a local radio broadcast, audio originating from a foreign language broadcast, audio providing natural sounds of a sporting event, or audio originating from a microphone associated with a player, coach, referee, umpire, or trainer.

3. A non-transitory computer-readable medium having instructions stored thereon, the instructions comprising:
  instructions for receiving a bit stream including at least one video feed and at least two audio feeds, wherein the at least one video feed and at least two audio feeds are directed to a single event;
  instructions for filtering the bit stream and providing to a media player a first video feed of the at least one video feed and a first audio feed of the at least two audio feeds;
  instructions for, in response to receiving a request to change audio feeds, discontinuing the first audio feed from being provided to the media player and continuing to provide the first video feed to the media player;
  instructions for synchronizing a second audio feed of the at least two audio feeds, wherein the second audio feed is synchronized with respect to the first video feed; and
  instructions for providing to the media player the first video feed and the second audio feed,
  wherein the instructions for synchronizing the second audio feed include:
    instructions for comparing a time signature associated with the second audio feed with a time signature associated with the first video feed and discarding portions of the second audio feed based on the result of the comparing; and
    instructions for comparing a time signature associated with the second audio feed with a time signature associated with the first video feed and buffering the second audio feed based on the result of the comparing,
  wherein the at least one video feed and the at least two audio feeds are initially synchronized at a media center prior to reception based on at least the timing of a slowest feed received from one or more sources,
  wherein the instructions for filtering and the instructions for synchronizing are associated with a media player plug-in module, and
  wherein the event is a baseball game, a football game, a basketball game, a hockey match, a golf tournament, an auto racing event, an Olympic event, a boxing match, a mixed martial arts event, a swimming event, a soccer match, a rugby tournament, a cricket match, or a wrestling event.

4. The non-transitory computer-readable medium of claim 3, wherein the at least two audio feeds include at least two of: audio originating from a national television broadcast, audio originating from a local television broadcast, audio originating from a national radio broadcast, audio originating from a local radio broadcast, audio originating from a foreign language broadcast, audio providing natural sounds of a sporting event, or audio originating from a microphone associated with a player, coach, referee, umpire, or trainer.

5. A device comprising:
  a processor;
  one or more communication interfaces configured to receive a bit stream including at least one video feed and at least two audio feeds, wherein the at least one video feed and at least two audio feeds are directed to a single event; and
  a non-transitory computer-readable medium have instructions stored thereon that, in response to being executed by the processor, cause the device to perform operations comprising:
  filtering the bit stream and providing to a media player a first video feed of the at least one video feeds and a first audio feed of the at least two audio feeds;
  in response to receiving a request to change audio feeds, discontinuing the first audio feed from being provided to the media player while continuing to provide the first video feed to the media player;
  synchronizing a second audio feed of the at least two audio feeds, wherein the second audio feed is synchronized with respect to the first video feed; and
  providing to the media player the first video feed and the second audio feed,
  wherein synchronizing the second audio feed comprises:
    comparing a time signature associated with the second audio feed with a time signature associated with the first video feed and discarding portions of the second audio feed based on the result of the comparing; and
    comparing a time signature associated with the second audio feed with a time signature associated with the first video feed and buffering the second audio feed based on the result of the comparing,
  wherein the at least one video feed and the at least two audio feeds are initially synchronized at a media center prior to reception based on at least the timing of a slowest feed received from one or more sources,
  wherein the filtering and synchronizing processes are conducted by a media player plug-in module resident on the device, and
  wherein the event is a baseball game, a football game, a basketball game, a hockey match, a golf tournament, an auto racing event, an Olympic event, a boxing match, a mixed martial arts event, a swimming event, a soccer match, a rugby tournament, a cricket match, or a wrestling event.

6. The device of claim 5, wherein the at least two audio feeds include at least two of: audio originating from a national television broadcast, audio originating from a local television broadcast, audio originating from a national radio broadcast, audio originating from a local radio broadcast, audio originating from a foreign language broadcast, audio providing natural sounds of a sporting event, or audio originating from a microphone associated with a player, coach, referee, umpire, or trainer.

* * * * *